(12) United States Patent
Kinross et al.

(10) Patent No.: US 11,113,869 B2
(45) Date of Patent: *Sep. 7, 2021

(54) TECHNIQUES FOR GENERATING VISUALIZATIONS OF RAY TRACING IMAGES

(71) Applicant: Microsoft Technology Licensing, LLC, Redmond, WA (US)

(72) Inventors: Austin Neil Kinross, Redmond, WA (US); Shawn Lee Hargreaves, Seattle, WA (US); Amar Patel, Woodinville, WA (US); Thomas Lee Davidson, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,634

(22) Filed: Dec. 31, 2019

(65) Prior Publication Data

US 2020/0134906 A1 Apr. 30, 2020

Related U.S. Application Data

(63) Continuation of application No. 15/910,538, filed on Mar. 2, 2018, now Pat. No. 10,559,115.

(51) Int. Cl.
*G06T 15/00* (2011.01)
*G06T 15/06* (2011.01)

(52) U.S. Cl.
CPC ............ *G06T 15/06* (2013.01); *G06T 15/005* (2013.01); *G06T 2200/24* (2013.01); *G06T 2210/12* (2013.01)

(58) Field of Classification Search
CPC ....... G06T 15/005; G06T 15/06; G06T 15/50; G06T 15/80; G06T 1/20;

(Continued)

(56) References Cited

U.S. PATENT DOCUMENTS 7,830,379 B2 * 11/2010 Peterson ................. G06T 15/06
345/426
8,736,610 B2 * 5/2014 McCombe .............. G06T 15/06
345/426

(Continued)

OTHER PUBLICATIONS

Parker SG, Friedrich H, Luebke D, Morley K, Bigler J, Hoberock J, McAllister D, Robison A, Dietrich A, Humphreys G, McGuire M. GPU raytracing. Communications of the ACM. May 1, 2013;56(5):93-101.*

(Continued)

*Primary Examiner* — Phu K Nguyen
(74) *Attorney, Agent, or Firm* — Arent Fox LLP

(57) ABSTRACT

Examples described herein generally relate to generating a visualization of an image. A proprietary structure that specifies ray tracing instructions for generating the image using ray tracing is intercepted from a graphics processing unit (GPU) or a graphics driver. The proprietary structure can be converted, based on assistance information, to a visualization structure for generating the visualization of the image. The visualization of the image can be generated from the visualization structure.

22 Claims, 6 Drawing Sheets

(58) Field of Classification Search
CPC ....... G06T 2207/20021; G06T 2200/04; G06T 2200/28
USPC ........................................................ 345/418
See application file for complete search history.

(56) References Cited

U.S. PATENT DOCUMENTS

| | | | |
|---|---|---|---|
| 9,424,685 B2* | 8/2016 | Howson | G06T 15/06 |
| 10,192,350 B2* | 1/2019 | Peterson | G06T 15/50 |
| 10,559,115 B2* | 2/2020 | Kinross | G06T 15/06 |

OTHER PUBLICATIONS

Parker SG, Bigler J, Dietrich A, Friedrich H, Hoberock J, Luebke D, McAllister D, McGuire M, Morley K, Robison A, Stich M. OptiX: a general purpose ray tracing engine. Acm transactions on graphics (tog). Jul. 26, 2010;29(4):1-3.*

* cited by examiner

TECHNIQUES FOR GENERATING VISUALIZATIONS OF RAY TRACING IMAGES

CLAIM OF PRIORITY UNDER 35 U.S.C. § 119

This application is a continuation of U.S. application Ser. No. 15/910,538, entitled "TECHNIQUES FOR GENERATING VISUALIZATIONS OF RAY TRACING IMAGES," filed Mar. 2, 2018, which is expressly incorporated by reference herein in its entirety for all purposes.

BACKGROUND

Use of computing devices is becoming more ubiquitous by the day. Computing devices range from standard desktop computers to wearable computing technology and beyond. One area of computing devices that has grown in recent years is in the context of image rendering, such as rendering of games, video streams, etc., which typically rely on a graphics processing unit (GPU) to render graphics from a computing device to a display device based on rendering instructions received from the computing device. Ray tracing of images is being developed as another solution for generating images, via an application, and requesting display of the images via a GPU. In ray tracing, the application can define the image to be displayed and can define an acceleration structure to facilitate efficiently generating the image on a display. An acceleration structure helps to decide, as quickly as possible, which objects from a scene a particular ray is likely to intersect and reject one or more objects that the ray will not hit. Performing the ray tracing based on the acceleration structure is conventionally driver-specific to allow GPU manufacturers to define ray tracing procedures for a respective GPU.

Tools have been developed for rasterized graphics that allow for visualization of certain rasterized images, objects in the images, etc., to allow a developer to debug or otherwise view rendered images/objects at a given point in time. Because ray tracing uses a driver-specific acceleration structure to define the image, conventional tools may not be able to process image data related to ray tracing to provide similar visualization features.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for generating a visualization of an image is provided. The method includes intercepting, from a graphics processing unit (GPU) or a graphics driver, a proprietary structure that specifies ray tracing instructions for generating the image using ray tracing, converting, based on assistance information, the proprietary structure to a visualization structure for generating the visualization of the image, and generating, from the visualization structure, the visualization of the image.

In another example, a computing device for generating a visualization of an image is provided. The computing device includes a memory storing one or more parameters or instructions for executing an operating system and one or more applications including a visualization application, and at least one processor coupled to the memory. The at least one processor is configured to intercept, from a GPU or a graphics driver, a proprietary structure that specifies ray tracing instructions for generating the image using ray tracing, convert, based on assistance information, the proprietary structure to a visualization structure for generating the visualization of the image, and generate, from the visualization structure, the visualization of the image.

In another example, a computer-readable medium, including code executable by one or more processors for generating a visualization of an image is provided. The code includes code for intercepting, from a GPU or a graphics driver, a proprietary structure that specifies ray tracing instructions for generating the image using ray tracing, converting, based on assistance information, the proprietary structure to a visualization structure for generating the visualization of the image, and generating, from the visualization structure, the visualization of the image.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
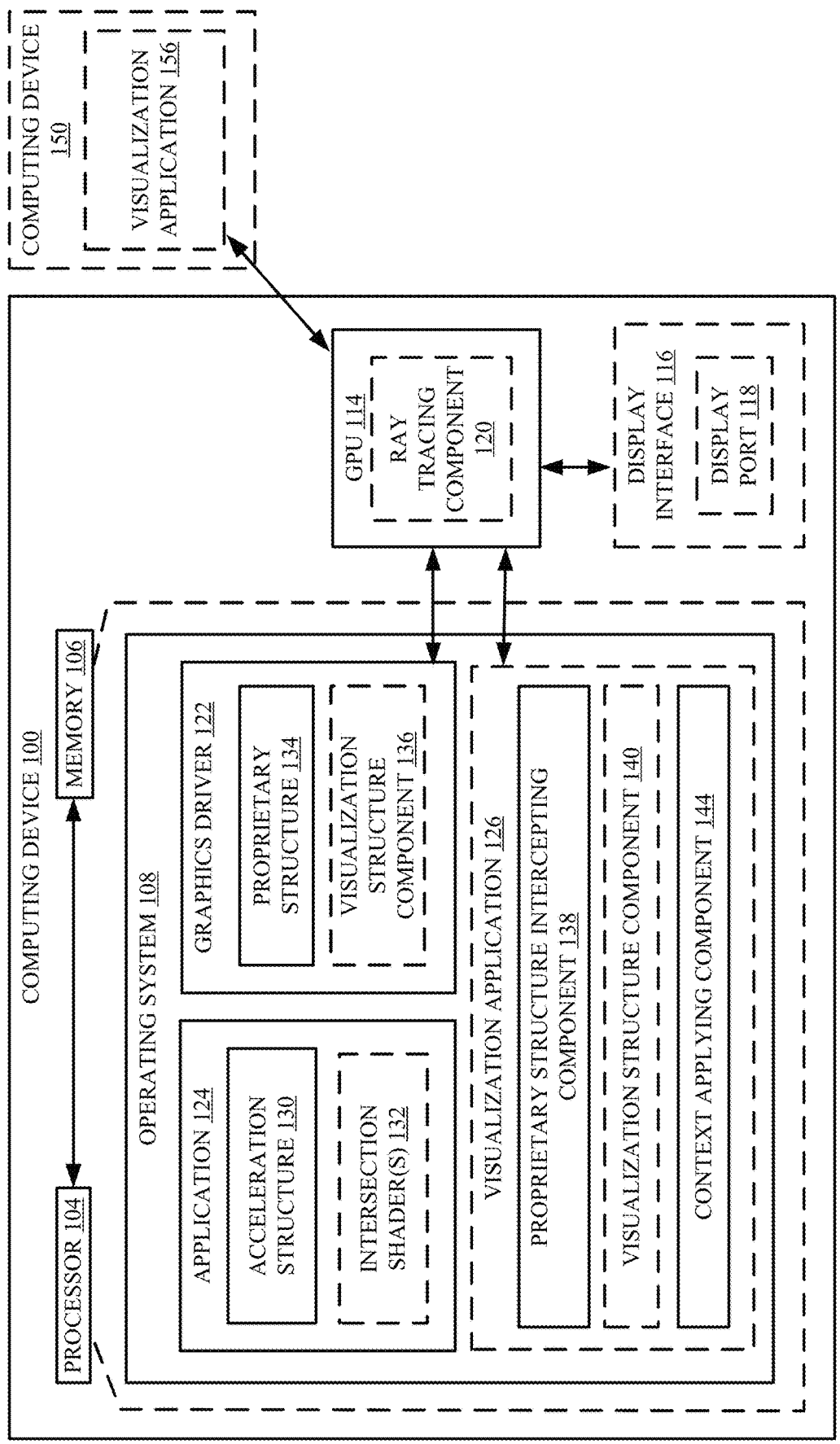
FIG. 1 is a schematic diagram of an example of a computing device for generating visualizations of images that can be ray traced by a graphics processing unit (GPU) in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to providing visualization of images that are defined by a structure used in ray tracing. For example, a proprietary structure used to instruct a graphics processing unit (GPU) to perform ray tracing, can be intercepted and converted to a visualization structure for providing a visualization of an image. For example, the proprietary structure can be generated by a graphics driver, e.g., based on a defined acceleration structure, for instructing the GPU on performing the ray tracing. In this regard, the proprietary structure may include efficiencies and may be of a proprietary format unknown within the assistance of the graphics driver. Thus, assistance information may be used to generate the visualization structure from the proprietary structure, as the image may not be entirely intuitive based only on the proprietary structure. In an example, the assistance information may be information determined and applied by a graphics driver that generates the proprietary structure in instructing the GPU on ray tracing the image, where the graphics driver can return the visualization structure and/or one or more parameters for generating the visualization structure. The visualization structure can be used to generate the visualization of the image or at least a portion of the image.

In one example, the graphics driver may receive an acceleration structure generated by an application, and may generate the proprietary structure based on the acceleration structure to introduce optimizations used by the GPU in ray tracing the image. Thus, for example, the graphics driver may be equipped with instructions for converting the proprietary structure to another structure, such as a visualization structure, which may be similar to the original acceleration structure in one example. In another example, the application may specify one or more bounding boxes in the acceleration structure to define placement of certain objects. In this example, the application can specify one or more intersection shaders to define location, shape, rotation, etc., of object geometry within the bounding box for the ray tracing. In this example, the intersection shaders can be the assistance information and can also be received or determined for generating the visualization structure, and the visualization structure may be generated based at least in part on applying the intersection shaders to the proprietary structure.

In either case, a visualization of the image can be generated (e.g., other than the actual image processed by the GPU) based on the proprietary structure without the mechanism generating the visualization knowing about the format of the proprietary structure. Rather, in one example, the graphics driver can be utilized to provide the visualization structure based on the proprietary structure, and/or, in another example, the intersection shaders from the application can be applied to the proprietary structure to generate a representation of the image in the visualization structure. A visualization of the image or at least a portion of the image can be generated based on the visualization structure and displayed using a tool to allow for viewing visualizations of rendered images. In one example, a context parameter can also be applied to the visualization structure to modify a characteristic thereof in the visualization (e.g., a camera viewpoint, a position, shape, orientation, zoom-level, color, etc.) to facilitate a programmer or application developer in debugging of imperfections in the rendering.

Figure 2:
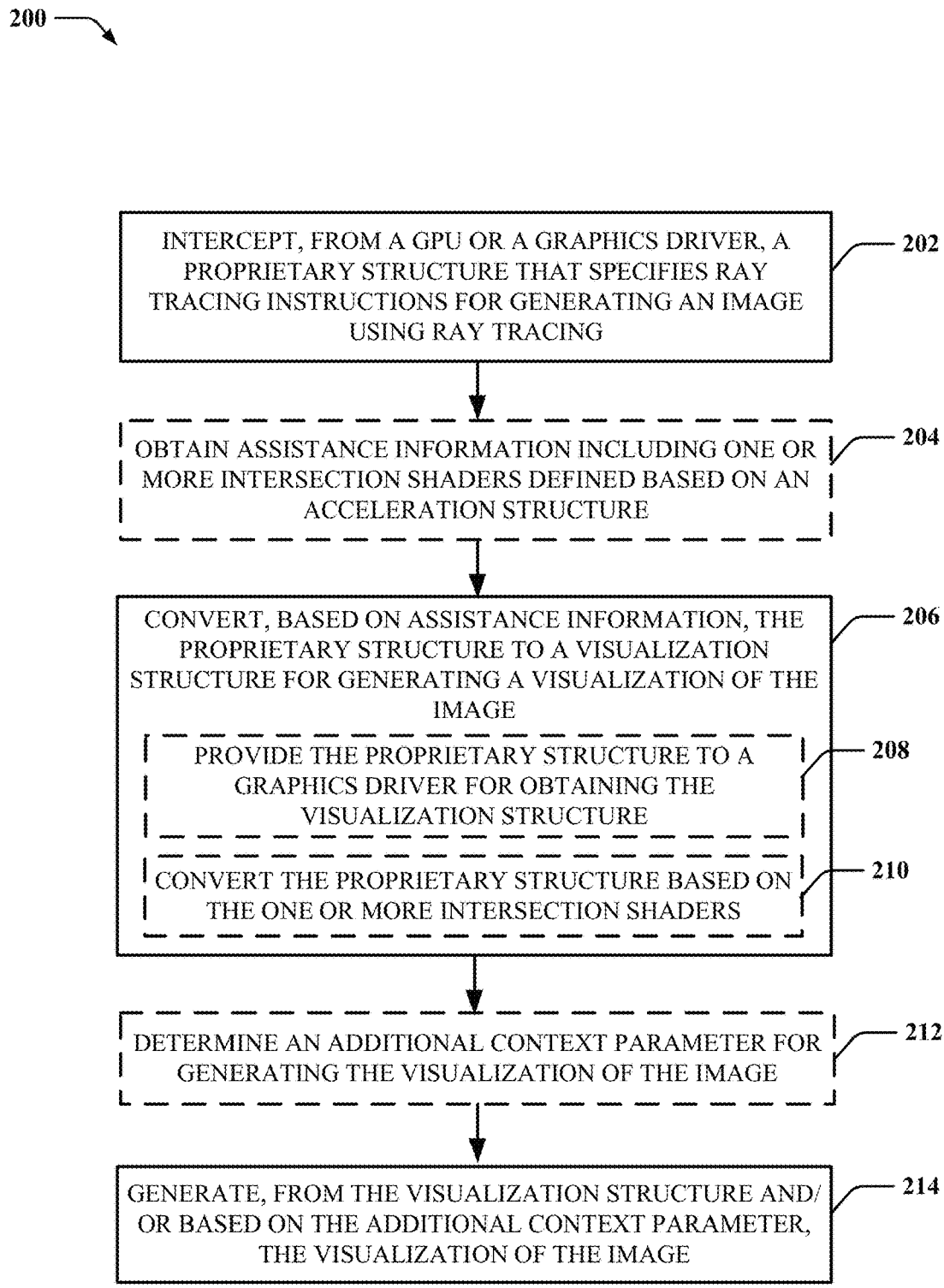
FIG. 2 is a flow diagram of an example of a method for generating a visualization of an image based on a proprietary ray tracing structure in accordance with examples described herein.

Turning now to FIGS. 1-6, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for generating visualization of images rendered using a GPU. For example, computing device 100 can include or can otherwise be coupled with a processor 104 and/or memory 106, where the processor 104 and/or memory 106 can be configured to execute or store instructions or other parameters related to generating visualizations of images rendered by a GPU, as described herein. Computing device 100 can execute an operating system 108 (e.g., via processor 104 and/or memory 106) for providing an environment for executing one or more applications. The computing device 100 can also include a GPU 114 for processing rendering instructions, and/or communicating associated commands to a display interface 116 to cause display of one or more images on a display, which may be coupled to the computing device 100 via a display port 118.

In an example, display interface 116 can be communicatively coupled with the processor 104 and/or memory 106 for communicating with a display (not shown) via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and the display.

In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions to the GPU 114. GPU 114 can process the rendering instructions to render an image, and can initiate display of at least a portion of the image on the display by transmitting associated signals to the display via display port 118 of display interface 116.

In an example, GPU 114 can support ray tracing, and thus may include a ray tracing component 120 operable for receiving a proprietary structure 134 that can be generated by a graphics driver 122, and performing ray tracing based on the proprietary structure 134 to render the image via the display interface 116. The graphics driver 122 can be specific to, and/or provided by, a manufacturer of the GPU 114 to generate the proprietary structure 134 to instruct the ray tracing component 120 on performing the ray tracing to display the image.

In one example, an application 124 can operate (e.g., via operating system 108) to generate images for displaying via display interface 116. Application 124 may generate an acceleration structure 130 that may define geometry for an image related to ray tracing, which may include information on one or more objects in the image, a location corresponding to one or more objects in the image, etc., such that a ray tracing capable GPU (e.g., GPU 114) can emulate photons sent out via rays, determine where light reflects, trace a point where the light returns from the scene, etc. to generate the image. In one example, application 124 can generate the acceleration structure 130 in a standardized format that can be provided to the graphics driver 122. The graphics driver 122 can generate a proprietary structure 134 based on the acceleration structure 130 to optimize the acceleration structure 130 for ray tracing on the GPU 114, where the proprietary structure 134 may be of a proprietary format, may include efficiencies, etc. that are known by the graphics driver 122 but not necessarily known to the application 124, visualization application 126, etc. In one example, the graphics driver 122 may optionally include a visualization structure component 136 for generating, from the proprietary structure 134, a visualization structure for use by a visualization application 126, 156 in generating a visualization of an image.

In addition, in an example, the application 124 may generate the acceleration structure 130 to define one or more bounding boxes (e.g., axis-aligned bounding boxes (AABBs), etc.) related to objects to be rendered in the image. In this example, the application 124 may also define one or more intersection shaders 132 that specify additional shape, orientation, etc., information for the objects in the bounding boxes that can be used at runtime (e.g., by the GPU 114) to determine actual location of objects within the bounding boxes in generating the image. The application 124 may provide the intersection shaders 132 to the graphics driver 122, or may otherwise execute the intersection shaders 132 when generating the acceleration structure 130 to define locations of corresponding objects within the image.

The operating system 108 may also include a visualization application 126 for generating visualizations of images to be displayed by the display interface 116, which may occur in a separate application, to allow a developer of application 124 to view certain visualizations and verify or debug the images being rendered. In an example, visualization application 126 may execute on the same computing device 100 or as visualization application 156 operating on a different computing device 150 (where the different computing device 150 can have a separate processor, memory, operating system, etc., to execute the visualization application 156) so long as the visualization application 126, 156 can at least communicate with GPU 114 (or a related component) to obtain the proprietary structure 134 sent to the GPU 114 for rendering images. The visualization application 126, 156 can operate to transform the proprietary structure 134 into a visualization structure, or to otherwise receive the visualization structure as described further herein, and to display the visualization structure as a visualization of at least a portion of the image. In displaying the visualization structure, the visualization application 126, 156 can provide some additional context to allow for interaction with the visualization of the image, more simplified identification of possible errors represented in the visualization of the image, etc.

In this regard, the visualization application 126, 156 may optionally include a proprietary structure intercepting component 138 for obtaining the proprietary structure 134 from the GPU 114 (or from the graphics driver 122 or as intercepted from a communication between the GPU 114 and graphics driver 122), a visualization structure component 140 for generating or receiving a visualization structure based on the proprietary structure (e.g., based on applying assistance information to the proprietary structure), and/or a context applying component 144 for applying additional context information to the visualization structure in generating or displaying a visualization of at least a portion of the image represented by the proprietary structure 134. Though these components are only shown in visualization application 126 in FIG. 1, visualization application 156 when configured to operate on a different computing device 150 can include the similar or same components to achieve similar or same functionality as described herein for the visualization application 126. Moreover, where interactions with the graphics driver 122 are described below (e.g., to provide the proprietary structure and/or receive the visualization structure), the visualization application 156 in a different computing device 150 may communicate with a local version of the graphics driver 122 or may otherwise communicate remotely with graphics driver 122 on computing device.

FIG. 2 is a flowchart of an example of a method 200 for generating visualizations of images, or at least a portion of an image, that are rendered by a GPU. For example, method 200 can be performed by the computing device 100, and is accordingly described with reference to FIG. 1, as a non-limiting example of an environment for carrying out method 200.

In method 200, at action 202, a proprietary structure that specifies ray tracing instructions for generating an image using ray tracing can be intercepted from a GPU or a graphics driver. In an example, proprietary structure intercepting component 138, e.g., in conjunction with processor 104, memory 106, visualization application 126, 156, etc., can intercept, from the GPU 114 or the graphics driver 122 (e.g., or a communication therebetween), the proprietary structure 134 that specifies ray tracing instructions for generating the image using ray tracing. For example, proprietary structure intercepting component 138 may intercept the proprietary structure 134 based on at least one of retrieving the proprietary structure 134 from the graphics driver 122 (e.g., based on graphics driver 122 calling a registered callback function indicated by the visualization application 126, 156 or other request), retrieving the proprietary structure 134 from the GPU 114 (e.g., based on GPU 114 calling a registered callback function indicated by the visualization application 126, 156 or other request), based on the GPU 114 reporting memory accesses, including storing the proprietary structure 134, to the visualization application 126, 156, etc.

For example, as described, application 124 can generate the acceleration structure 130 that defines geometry for an image, where the image can be one image in a stream of images. The acceleration structure 130, for example, may define one or more objects, location of the one or more objects in the scene, etc., and may be generated based on a standard format that graphics driver 122 (e.g., various graphics drivers for various GPUs) can receive and generate the proprietary structure 134 for instructing the GPU 114 on ray tracing the image via ray tracing component 120. As the proprietary structure 134 is specific to the graphics driver 122 and/or GPU 114 implementation, visualization application 126, 156 may not be able to interpret the proprietary structure 134 without some assistance information from the graphics driver 122 (e.g., where the assistance information may be defined at the graphics driver 122 and used to convert the proprietary structure 134 to the acceleration structure 130, a simplified version of the acceleration structure 130, or substantially any visualization structure that can be understood and interpreted by the visualization application 126 for displaying the visualization). As the graphics driver 122 converts the acceleration structure 130 to the proprietary structure 134, the graphics driver 122 may be able to convert the proprietary structure 134 back to the acceleration structure 130 (or a similar structure), which may be similar to a visualization structure that the visualization application 126, 156 can interpret and use to generate a visualization of the image.

In another example, the acceleration structure 130 may additionally or alternatively define one or more bounding boxes (e.g., AABBs) that can define boundaries for rendering objects in an image. In this example, the application 124 can also define or otherwise use one or more intersection shaders 132 to specify properties of the objects within the related bounding boxes, such as a shape or orientation of the objects, intersection points of the objects, etc., which the graphics driver 122 can execute, or use the output of the intersection shaders 132, in generating the proprietary structure 134 or otherwise during instructing the GPU 114 to perform ray tracing based on the proprietary structure 134. For example, during ray tracing by the GPU 114, the application 124 can apply the one or more intersection shaders 132 to define the shape/orientation of objects to be ray traced. In this example, the intersection shaders 132 can also be obtained and utilized by the visualization application 126, 156 to generate the visualization structure, as described further herein.

In method 200, optionally at action 204, assistance information including one or more intersection shaders defined based on an acceleration structure can be obtained. In an example, visualization structure component 140, e.g., in conjunction with processor 104, memory 106, visualization application 126, 156, etc., can obtain the assistance information including the one or more intersection shaders 132 defined based on the acceleration structure 130. For example, the acceleration structure 130, in one example, may define one or more bounding boxes that include objects to be rendered in ray tracing, as described, and may accordingly define the one or more intersection shaders 132 to indicate parameters for rendering the objects within the bounding boxes, such as a shape and/or orientation of the object, intersection points for the object within the bounding box and/or as related to other bounding boxes, etc. In an example, visualization structure component 140 can obtain the intersection shaders 132 from the application 124 (e.g., via a request sent to the application 124), from the graphics driver 122 based on a call from the application 124 to execute the one or more intersection shaders 132 in performing ray tracing, and/or the like. In any case, as described herein, the one or more intersection shaders 132 can assist with rendering the image by providing the shape/orientation information, intersection information, etc., for objects defined by bounding boxes in the acceleration structure 130 and/or the proprietary structure 134. Thus, the intersection shaders 132 can also assist in generating the visualization structure by providing the shape/orientation information, intersection information, etc., for objects defined by bounding boxes in the acceleration structure 130 and/or accordingly in the proprietary structure 134, as described further herein.

In method 200, at action 206, the proprietary structure can be converted, based on the assistance information, to a visualization structure for generating a visualization of the image. In an example, visualization structure component 136 or 140, e.g., in conjunction with processor 104, memory 106, graphics driver 122, and/or visualization application 126, 156, etc., can convert, based on the assistance information, the proprietary structure to the visualization structure for generating the visualization of the image. For example, visualization structure component 136 can generate the visualization structure based on applying assistance information to the proprietary structure 134, which can be received from the visualization application 126, 156, based on assistance information that may also be proprietary to the graphics driver. For example, as described, the graphics driver 122 (and/or a local version of the graphics driver on the different computing device 150 or other software provided by the GPU manufacturer) can include instructions for generating the proprietary structure 134 from the acceleration structure 130, and may thus include instructions (e.g., assistance information) for converting the proprietary structure 134 back to the acceleration structure 130 and/or to a visualization structure. In one example, the visualization structure may be a simplified version of the acceleration structure that may or may not include some/all layers of ray tracing instructions, shaders, etc., such as color or lighting layers applied to the image. In addition, for example, visualization structure component 136 may provide the visualization structure to the visualization application 126, 156 as a rasterized image or otherwise a set of rasterization instructions (e.g., to which context can be applied by using one or more shaders, as described further herein).

In this example, converting the proprietary structure at action 206 may optionally include, at action 208, providing the proprietary structure to a graphics driver for obtaining the visualization structure. In this example, visualization structure component 140, e.g., in conjunction with processor 104, memory 106, and/or visualization application 126, 156, etc., can provide the proprietary structure 134, intercepted from the graphics driver 122 or GPU 114, to the graphics driver 122 for obtaining the visualization structure. For example, as described, the obtained visualization structure may be similar to the original acceleration structure 130 or another structure that can be processed by visualization application 126, 156 for displaying the visualization of the image or at least a portion thereof. In this example, graphics driver 122 applies its proprietary instructions to the proprietary structure 134 to generate the visualization structure for the visualization application 126, 156. In one example, the graphics driver 122 may optimize away one or more features of the image, such as object layers which may not be displayed in the image, in generating the visualization structure.

In another example, the assistance information may include the one or more intersection shaders 132, and converting the proprietary structure at action 206 may optionally include, at action 210, converting the proprietary structure based on the one or more intersection shaders. In this example, visualization structure component 140, e.g., in conjunction with processor 104, memory 106, and/or visualization application 126, 156, etc., can provide convert the proprietary structure based on the one or more intersection shaders 132. For example, visualization structure component 140 can convert the proprietary structure 134 based at least in part on applying the one or more intersection shaders 132 thereto, based at least in part on applying the one or more intersection shaders 132 to an acceleration structure derived from the proprietary structure (e.g., by the graphics driver 122), etc. when rendering the visualization structure. In this example, visualization application 126, 156 may use the GPU 114 to render the visualization of the image as the proprietary structure 134 having one or more of the intersection shaders 132 applied. In one example, as described herein, the visualization application 126, 156 can allow for selecting the one or more intersection shaders 132 to be applied in generating the visualization of the image. This can allow for applying a shape/orientation to objects in bounding boxes, intersection points, etc. to create the visualization of the image, rather than just a list of bounding boxes that may be stored in the proprietary structure.

In any case, the visualization application 126, 156 can obtain a visualization structure from the proprietary structure 134 for generating a visualization of a corresponding image and/or portion of the image (e.g., an object in the image, an object in a bounding box of the image, etc.), which can be displayed via the visualization application 126, 156 to allow a developer to view the image, debug errors in rendering of the image, etc.

In method 200, optionally at action 212, an additional context parameter can be determined for generating the visualization of the image. In an example, context applying component 144, e.g., in conjunction with processor 104, memory 106, and/or visualization application 126, 156, etc., can determine, and apply, the additional context parameter for generating the visualization of the image. In an example, context applying component 144 can determine the additional context parameter to provide a modified visualization of the image and/or a portion of the image. For example, the additional context parameter may relate to modifying a camera viewpoint associated with the image and/or a related object in the image, such to provide a view of the image and/or object for visualizing the underlying acceleration structure. In another example, with the camera view point set, the additional context parameter may additionally or alternatively relate to a rotation for the image or portion thereof, a zoom level for the image or portion thereof, a lighting or color parameter for modifying the image or portion thereof, etc. For example, the visualization application 126, 156 can allow for modifying the context of the visualization to change the camera viewpoint, highlight certain areas of the image, zoom-in or zoom-out of the image, rotate the image, etc., which can be features provided on a user interface to allow a developer to view the image such to debug errors in rendering. In one example, context applying component 144 can apply one or more shaders to the visualization to effectuate applying the one or more additional context parameters. In another example, context applying component 144 may obtain and apply one or more other context parameters that are applied in generating the image geometry to be displayed by the application 124.

In method 200, at action 214, the visualization of the image can be generated from the visualization structure and/or based on the additional context parameter. In an example, visualization application 126, 156, e.g., in conjunction with processor 104, memory 106, etc., can generate, from the visualization structure and/or based on the additional context parameter, the visualization of the image. For example, the visualization structure may be in a format that the visualization application 126, 156 can interpret, which may include an acceleration structure 130 format from which the visualization can be ray traced, a format indicating rasterization geometry for rasterizing the visualization, etc. In any case, visualization application 126, 156 can generate and display the visualization (e.g., via display interface 116) and/or may allow for interaction therewith, which may include, as described above, changing a camera viewpoint for viewing the image, rotating the image, zooming-in or zooming-out of the image, etc. The interactions, in this regard, may cause context applying component 144 to apply context to the visualization, as described above and in action 212 to effectuate the interactions, in one example.

Figure 3:
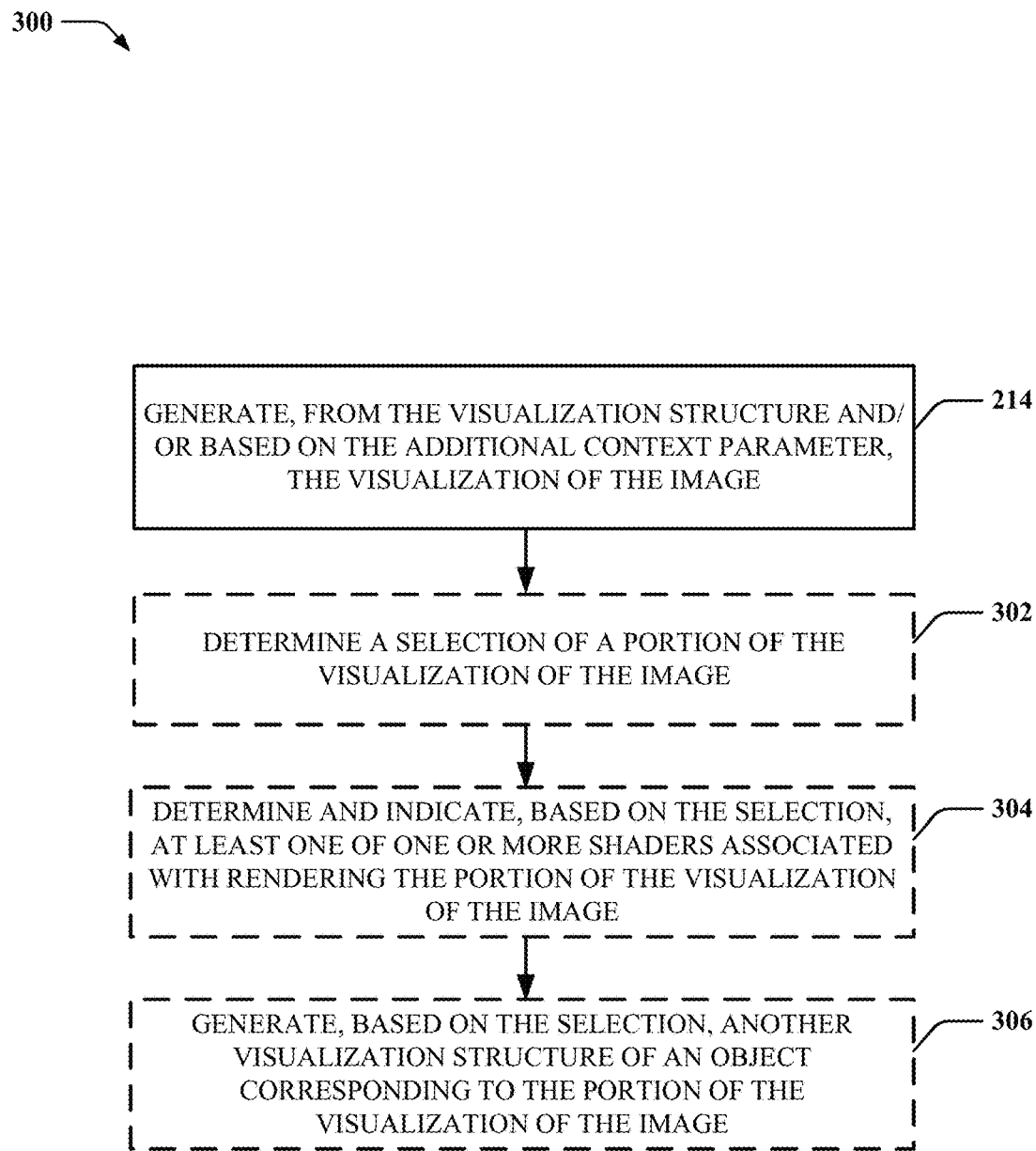
FIG. 3 is a flow diagram of an example of a method for modifying a visualization of an image in accordance with examples described herein.

FIG. 3 is a flowchart of an example of a method 300 for generating visualizations of images, or at least a portion of an image, that are rendered by a GPU. For example, method 300 can be performed by a computing device 100, and is accordingly described with reference to FIG. 1, as a non-limiting example of an environment for carrying out method 300. In addition, method 300 may occur in conjunction with one or more actions described with reference to method 200 in FIG. 2, in some examples. For example, the visualization generated in method 200 may be modified using the actions of method 300.

In method 300, at action 214, the visualization of the image can be generated from the visualization structure and/or based on the additional context parameter, as described with respect to FIG. 2. In an example, visualization application 126, 156, e.g., in conjunction with processor 104, memory 106, etc., can generate, from the visualization structure and/or based on the additional context parameter, the visualization of the image, as described. In one example, visualization application 126, 156 can generate the visualization of the image and can allow for interaction therewith to determine move the image, or portions thereof, to view from different angles, to add color to the image or a portion thereof, to determine one or more shaders used to generate the image, etc., as described herein. For example, visualization application 126, 156 can provide an interface (e.g., a user interface, as described further herein) to display the visualization of the image and to allow a developer to perform such actions on the image or a portion thereof. In one example, the visualization application 126, 156 can allow for selection of a portion of the visualization of the image to provide more information regarding the selection, such as one or more shaders used in generating the selected portion of the visualization, a visualization of the portion of the image by itself (e.g., of an object in the image for closer inspection), etc.

Thus, in method 300, optionally at action 302, a selection of a portion of the visualization of the image can be determined. In an example, visualization application 126, 156, e.g., in conjunction with processor 104, memory 106, etc., can determine the selection of the portion of the visualization of the image. For example, the visualization application 126, 156 may allow for selection by movement of a cursor to the portion of the visualization, selecting the portion using a selection box or other shape, etc. In any case, visualization application 126, 156 may determine the portion of the visualization corresponding to the selection, which may include one or more objects in the image. In one example, visualization application 126, 156 may receive or determine the visualization structure as a collection of objects (e.g., rather than as one single structure for the image), which may allow for selection of the portions (e.g., objects) of the visualization of the image.

In addition, in method 300, optionally at action 304, at least one of one or more shaders associated with rendering the portion of the visualization of the image can be determined and indicated based on a selection of a portion of the visualization of the image. In an example, visualization application 126, 156, e.g., in conjunction with processor 104, memory 106, etc., can determine and indicate, based on a selection of a portion of the visualization of the image, at least one of one or more shaders associated with rendering the portion of the visualization of the image. For example, visualization application 126, 156 can determine and/or indicate one or more intersection shaders determined as corresponding to the selected portion (e.g., where the proprietary structure is converted to the visualization structure including multiple portions that can have associated intersection shaders). In this regard, the visualization application 126, 156 can determine and indicate the one or more shaders to allow for debugging a given shader where rendering errors are detected. In addition, in one example, real-time modifications of the shader may be allowed and/or reapplied (e.g., via context applying component 144) to allow the developer to correct detected rendering errors in the portion of the image.

Additionally, in method 300, optionally at action 306, another visualization structure of an object corresponding to the portion of the visualization of the image can be generated based on the selection. In an example, visualization application 126, 156, e.g., in conjunction with processor 104, memory 106, etc., can generate, based on the selection, another visualization structure of an object corresponding to the portion of the visualization of the image. For example, the visualization application 126, 156 may present an additional interface showing just the selected portion (e.g., an object in the image, where the proprietary structure is converted to the visualization structure including multiple portions or objects). The visualization application 126, 156 may allow for similar modification of this object such as adding a context via context applying component 144, which may execute one or more shaders to modify one or more parameters associated with the object, such as camera viewpoint, shape/orientation, size, zoom-in, zoom-out, color, lighting, etc., as described. This can allow for more granular debugging of objects within the rendered image.

Figure 4:
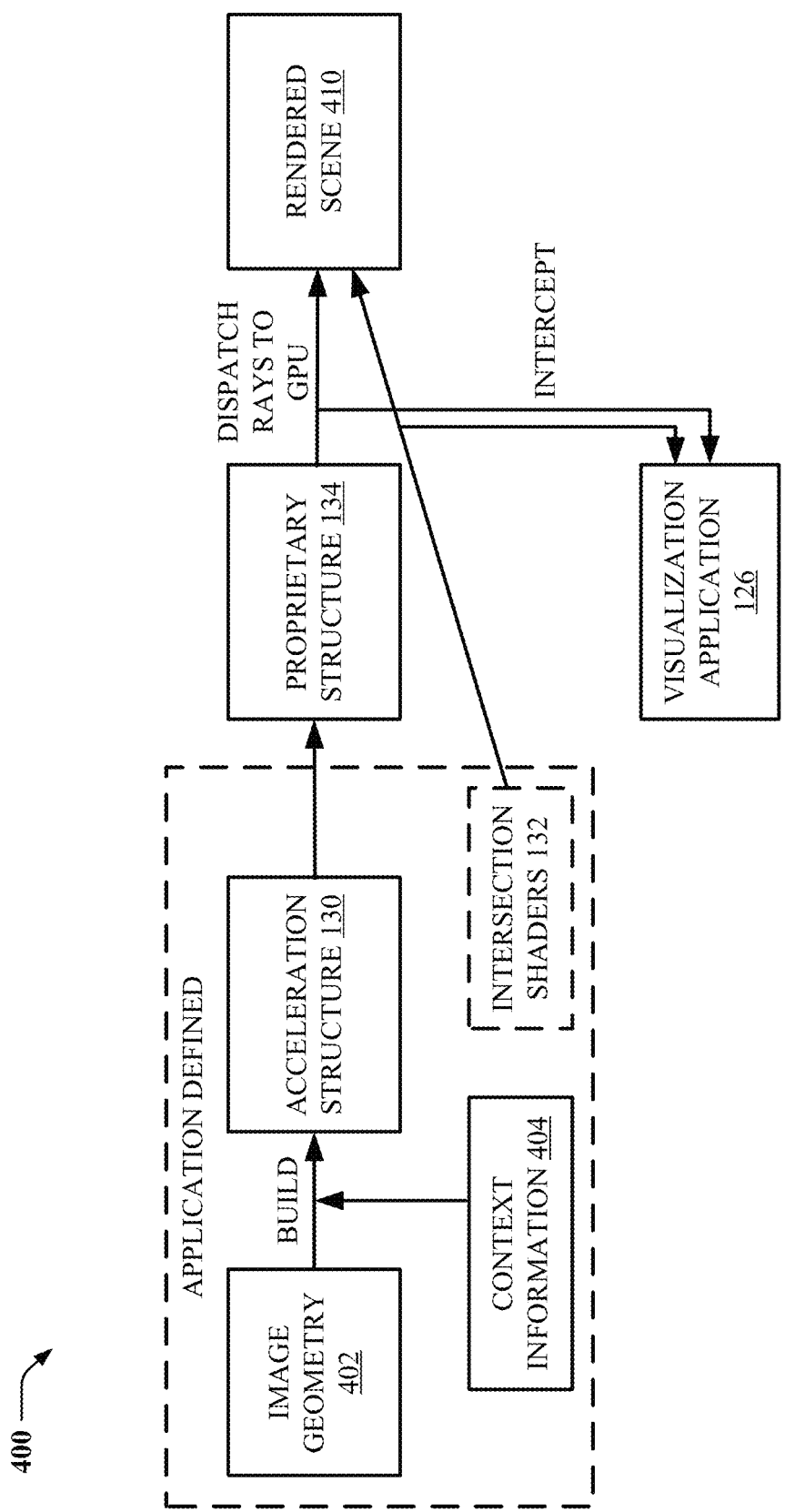
FIG. 4 illustrates an example of a data flow for intercepting image data to generate a visualization of the image in accordance with examples described herein.

FIG. 4 illustrates an example of a data flow 400 of image data from image geometry 402 created by an application (e.g., application 124) to a rendered scene 410. In this example, an application, such as application 124, can generate image geometry 402 to be rendered on a display. The application 124 can combine the image geometry 402 along with context information 404 to build an acceleration structure 130 representing the image geometry 402. For example, the context information 404 may include location of object within the image, color of objects within the image, one or more shaders used to generate the image, etc. In any case, the application 124 may build the acceleration structure 130, which may include calling an application programming interface (API) or other mechanism to generate a standardized acceleration structure 130. In an example, where the acceleration structure 130 is generated to include bounding boxes, one or more intersection shaders 132 can also be created or otherwise determined or employed to define certain parameters of the image, such as object shape/orientation, intersection points, etc., as described.

The acceleration structure 130 can be used to generate the proprietary structure 134 (e.g., by the graphics driver) for instructing a GPU on ray tracing the image of the rendered scene 410. For example, the proprietary structure 134 can be used to dispatch rays to the GPU (e.g., GPU 114) for performing the ray tracing to generate the rendered scene 410. In another example, the intersection shaders 132 can also be provided for generating the rendered scene 410 based on the proprietary structure 134 In addition, for example, the proprietary structure 134 and/or related parameters may be intercepted by the visualization application 126, 156, which can also include intercepting the intersection shaders 132 where present. As described above, the visualization application 126, 156 may provide the intercepted proprietary structure 134 to the graphics driver for receiving a visualization structure that can be used by the visualization application 126, 156 for generating the visualization of the image (e.g., along with the intersection shaders or otherwise).

Figure 5:
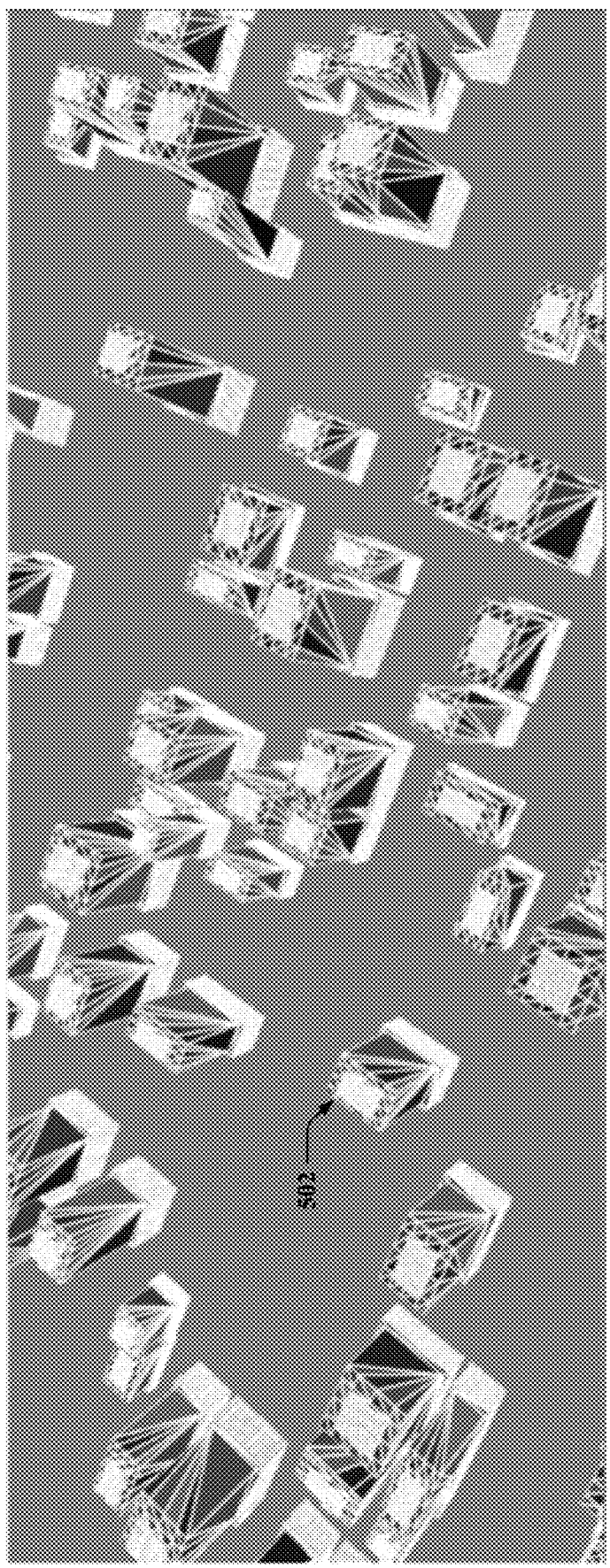
FIG. 5 illustrates an example of an interface for displaying a visualization of an image in accordance with examples described herein.

FIG. 5 illustrates an example of an interface for displaying the visualization of the image 500 on a display device (e.g., via a visualization application 126 interacting with a GPU 114 to display the interface on a display device coupled to the display interface 116). As described, the visualization of the image 500 may include a simplified rendering of the image generated from the proprietary structure (e.g., with assistance information in the form of proprietary instructions performed by the graphics driver and/or intersection shaders). For example, the simplified rendering shows a plurality of objects, such as object 502 that may be a three-dimensionally rendered building in the visualization of the image 500, but may not include all color, lighting, or other parameters/shaders of the original proprietary structure that is otherwise ray traced by the GPU. The visualization of the image 500 may include an additional context parameter for the image, which may allow for changing the camera viewpoint for the image, rotating the image, zooming-in or zooming-out of the image, coloring one or more portions of the image, applying a lighting parameter to the image, etc. In any case, for example, the context may be specified by the visualization application to allow a developer to modify the image viewpoint, add/remove color, lighting, etc., rotate the image, zoom-in or zoom-out, etc., which can involve applying one or more shaders to the image to achieve these effects. This can facilitate debugging rendering errors by providing the different visualization views as requested via the user interface, as described. Moreover, the interface may allow for selection a portion of the visualization of the image 500 for further information, such as one or more shaders used in generating the portion of the image, for generation of another visualization for the selected portion of the image, etc. In an example, the selected portion of the image may include one or more objects 502 that may have a separate definition of geometry in the proprietary structure and/or associated acceleration structure (and thus perhaps in the visualization structure as well, as described).

Figure 6:
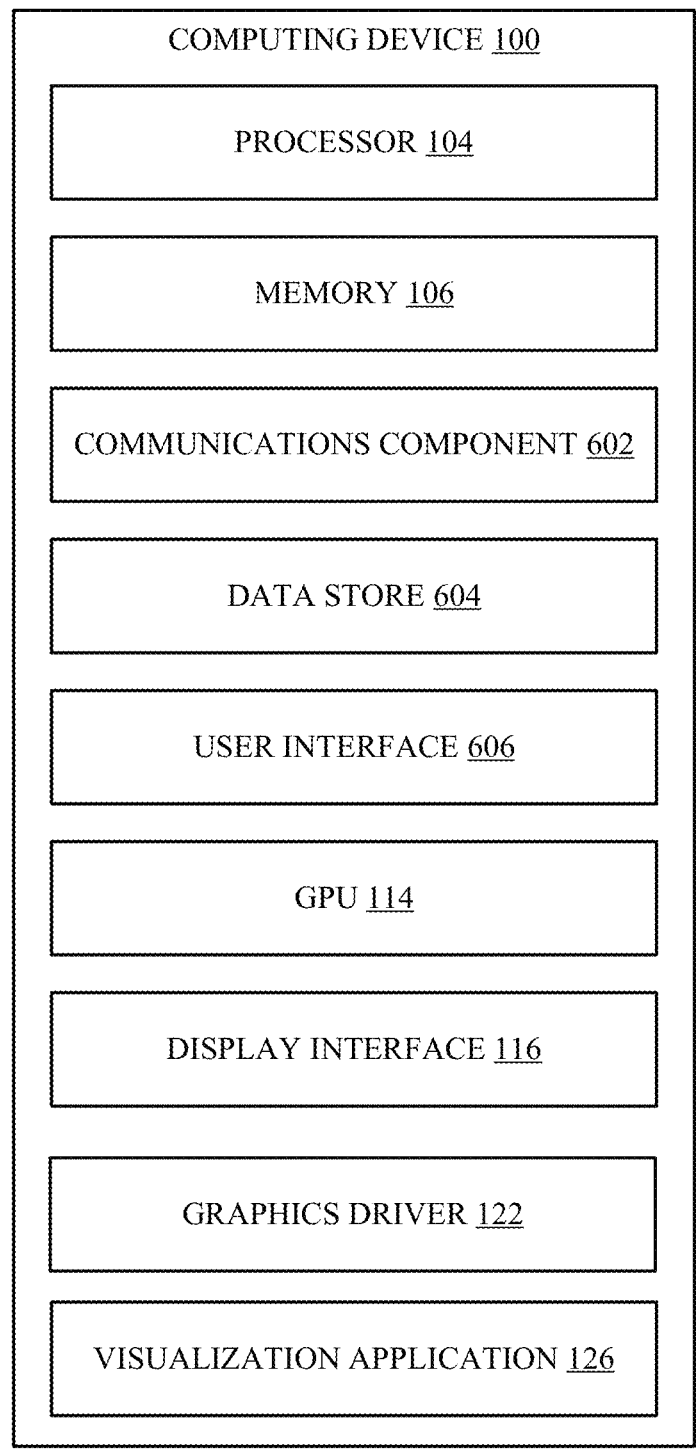
FIG. 6 is a schematic diagram of an example of a computing device for performing functions described herein.

FIG. 6 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as graphics driver 122, visualization application 126, and/or components thereof, display drivers, etc., as described herein, and/or other components of the computing device 100.

Further, computing device 100 may include a communications component 602 that provides for establishing and maintaining communications with one or more other devices, parties, entities, etc. utilizing hardware, software, and services as described herein. Communications component 602 may carry communications between components on computing device 100, as well as between computing device 100 and external devices, such as devices located across a communications network and/or devices serially or locally connected to computing device 100. For example, communications component 602 may include one or more buses, and may further include transmit chain components and receive chain components associated with a wireless or wired transmitter and receiver, respectively, operable for interfacing with external devices. For example, communications component 602 can carry communications between visualization application 126 and a GPU on another device, between distributed components of visualization application 126, etc.

Additionally, computing device 100 may include a data store 604, which can be any suitable combination of hardware and/or software, that provides for mass storage of information, databases, and programs employed in connection with examples described herein. For example, data store 604 may be or may include a data repository for applications and/or related parameters not currently being executed by processor 104. In addition, data store 604 may be a data repository for an operating system, application, such as graphics driver 122, visualization application 126, and/or components thereof, display driver, etc. executing on the processor 104, and/or one or more other components of the computing device 100.

Computing device 100 may also include a user interface component 606 operable to receive inputs from a user of computing device 100 and further operable to generate outputs for presentation to the user (e.g., via display interface 116 to a display device). User interface component 606 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 606 may include one or more output devices, including but not limited to a display interface 116, a speaker, a haptic feedback mechanism, a printer, any other mechanism capable of presenting an output to a user, or any combination thereof. In an example, user interface component 606 can display or can include interface 500 or similar interfaces to display memory usage information, as described herein.

Computing device 100 can also include a GPU 114, as described herein, for rendering images based on ray tracing instructions received from processor 104. GPU 114 can additionally send signals via a display interface 116 to cause display of the rendered images on a display (not shown). Additionally, computing device 100 may include a graphics driver 122, as described herein, to provide the ray tracing instructions (e.g., in a proprietary structure) to the GPU 114 and/or to convert the proprietary structure to a visualization structure, as described herein. Additionally, computing device 100 may include a visualization application 126, as described herein, to generate visualizations of images to be ray traced based on the proprietary structure without knowing details of the proprietary structure.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for providing a structure to a visualization application, comprising:
   obtaining, by a graphics processing unit (GPU) and based on a request from a different application executing on a central processing unit (CPU), a structure that specifies ray tracing instructions for generating an image for the different application; and
   providing, by the GPU and based on a request from the visualization application, the structure to the visualization application, wherein the visualization application is a separate application from the different application and is executing on the CPU or a different CPU to separately generate the image.

2. The method of claim 1, wherein providing the structure to the visualization application is based on accessing, by the GPU, a memory to store the structure for generating the image.

3. The method of claim 1, wherein providing the structure to the visualization application comprises calling a function registered by the visualization application for receiving the structure.

4. The method of claim 1, further comprising performing, by the GPU, ray tracing of the image based on receiving the structure from a graphics driver.

5. A method for providing a visualization structure to a visualization application, comprising:
  receiving, by a graphics driver and from the visualization application, a structure proprietary to the graphics driver that specifies ray tracing instructions for generating an image by a graphics processing unit (GPU) based on a request from a different application executing on a central processing unit (CPU);
  converting the structure to the visualization structure for use by the visualization application; and
  providing, to the visualization application, the visualization structure, wherein the visualization application is a separate application from the different application and is executing on the CPU or a different CPU to separately generate the image.

6. The method of claim 5, further comprising:
  generating, by the graphics driver and from an acceleration structure received from the different application, the structure proprietary to the graphics driver; and
  providing the structure to the GPU for ray tracing the image,
  wherein converting the structure to the visualization structure includes generating the visualization structure as at least a portion of the acceleration structure.

7. The method of claim 6, wherein converting the structure to the visualization structure comprises optimizing away one or more features of the acceleration structure.

8. The method of claim 7, wherein the one or more features include one or more object layers defined by the acceleration structure that are not displayed in ray tracing the image.

9. The method of claim 5, further comprising receiving assistance information of one or more intersection shaders for the structure, wherein converting the structure to the visualization structure comprises applying the one or more intersection shaders to the structure to generate the visualization structure.

10. The method of claim 9, wherein applying the one or more intersection shaders comprises applying a shape or orientation to objects of the image in bounding boxes.

11. The method of claim 9, wherein receiving the assistance information comprises receiving the assistance information from the visualization application.

12. A computing device for providing a structure to a visualization application, comprising:
  a memory for storing a structure that specifies ray tracing instructions for generating an image; and
  at least one graphics processing unit (GPU) coupled to the memory, wherein the at least one GPU is configured to:
    obtain, based on a request from a different application executing on a central processing unit (CPU), a structure that specifies ray tracing instructions for generating an image for the different application; and
    providing, based on a request from the visualization application, the structure to the visualization application, wherein the visualization application is a separate application from the different application and is executing on the CPU or a different CPU to separately generate the image.

13. The computing device of claim 12, wherein the at least one GPU is configured to provide the structure to the visualization application based on accessing, by the GPU, the memory to store the structure for generating the image.

14. The computing device of claim 12, wherein the at least one GPU is configured to provide the structure to the visualization application at least in part by calling a function registered by the visualization application for receiving the structure.

15. The computing device of claim 12, wherein the at least one GPU is further configured to provide perform ray tracing of the image based on receiving the structure from a graphics driver.

16. A computing device for providing a visualization structure to a visualization application, comprising:
  a memory storing one or more parameters or instructions for executing an operating system and a graphics driver for communicating with a graphics processing unit (GPU); and
  at least one processor coupled to the memory, wherein the at least one processor is configured to:
    receive, from the visualization application, a structure proprietary to the graphics driver that specifies ray tracing instructions for generating an image by the GPU based on a request from a different application executing on a central processing unit (CPU);
    convert the structure to the visualization structure for use by the visualization application; and
    provide, to the visualization application, the visualization structure, wherein the visualization application is a separate application from the different application and is executing on the CPU or a different CPU to separately generate the image.

17. The computing device of claim 16, wherein the at least one processor is further configured to:
  generate, from an acceleration structure received from the different application, the structure proprietary to the graphics driver; and
  provide the structure to the GPU for ray tracing the image,
  wherein the at least one processor is configured to convert the structure to the visualization structure at least in part by generating the visualization structure as at least a portion of the acceleration structure.

18. The computing device of claim 17, wherein the at least one processor is configured to convert the structure to the visualization structure at least in part by optimizing away one or more features of the acceleration structure.

19. The computing device of claim 18, wherein the one or more features include one or more object layers defined by the acceleration structure that are not displayed in ray tracing the image.

20. The computing device of claim 16, wherein the at least one processor is further configured to receive assistance information of one or more intersection shaders for the structure, wherein the at least one processor is configured to convert the structure to the visualization structure at least in part by applying the one or more intersection shaders to the structure to generate the visualization structure.

21. The computing device of claim 20, wherein the at least one processor is configured to apply the one or more intersection shaders at least in part by applying a shape or orientation to objects of the image in bounding boxes.

22. The computing device of claim 20, wherein the at least one processor is configured to receive the assistance information from the visualization application.

\* \* \* \* \*